US012189969B2

United States Patent
Zhou et al.

(10) Patent No.: US 12,189,969 B2
(45) Date of Patent: Jan. 7, 2025

(54) SYSTEM AND METHOD FOR ALLOCATING MEMORY SPACE

(71) Applicant: Lemon Inc., Grand Cayman (KY)

(72) Inventors: Ping Zhou, Los Angeles, CA (US);
Kan Frankie Fan, Los Angeles, CA (US); Chaohong Hu, Los Angeles, CA (US); Longxiao Li, Los Angeles, CA (US); Peng Xu, Los Angeles, CA (US); Fei Liu, Los Angeles, CA (US); Hui Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 154 days.

(21) Appl. No.: 18/066,973

(22) Filed: Dec. 15, 2022

(65) Prior Publication Data

US 2023/0122533 A1 Apr. 20, 2023

(51) Int. Cl.
*G06F 12/00* (2006.01)
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/064* (2013.01); *G06F 3/0674* (2013.01); *G06F 12/0246* (2013.01); *G06F 2212/7202* (2013.01)

(58) Field of Classification Search
CPC .............. G06F 12/0246; G06F 2212/7202
See application file for complete search history.

(56) References Cited

U.S. PATENT DOCUMENTS

| 8,225,065 | B2 | 7/2012 | Reynya et al. |
| 8,671,261 | B2 | 3/2014 | Colombo et al. |
| 9,575,678 | B2 | 2/2017 | Miller et al. |
| 10,482,012 | B1 | 11/2019 | Gordon |
| 2016/0334997 | A1 | 11/2016 | Wang et al. |
| 2018/0074703 | A1* | 3/2018 | Dawirs ............... G11C 16/3459 |
| 2018/0357000 | A1* | 12/2018 | Oukid .................. G06F 3/0679 |
| 2021/0073038 | A1* | 3/2021 | Jones ................... G06F 3/0679 |
| 2021/0133159 | A1* | 5/2021 | Bono .................. G06F 16/1744 |

OTHER PUBLICATIONS

European Patent Office, Extended European Search Report Issued in Application No. 23215492.2, May 17, 2024, 6 pages.

\* cited by examiner

*Primary Examiner* — John A Lane
(74) *Attorney, Agent, or Firm* — Alleman Hall & Tuttle LLP

(57) ABSTRACT

A system and method are described to efficiently allocate memory space with low latency overhead by allocating blocks of non-volatile memory on a storage device according to a tree data structure comprising a plurality of counter sets, each counter set including one or a plurality of counters indicating numbers of unallocated blocks of memory space within the non-volatile memory.

18 Claims, 5 Drawing Sheets

SYSTEM AND METHOD FOR ALLOCATING MEMORY SPACE

BACKGROUND

Free space allocators are key components in large scale storage systems which are responsible for managing the free spaces in address spaces. Bitmaps and range lists are often used to keep track of free and allocated memory spaces in storage systems. However, at massive scales, the address spaces pose challenges to free space allocators, which must navigate difficulties in maintaining low latency overhead while efficiently handling memory allocation requests, even when the free space is highly fragmented across a large memory space.

SUMMARY

In view of the above, a computing system for allocating memory space is provided. The computing system comprises a processor and memory of a computing device, the processor being configured to execute a memory allocator using portions of the memory to allocate blocks of non-volatile memory on a storage device according to a tree data structure comprising a plurality of counter sets, each counter set including one or a plurality of counters indicating numbers of unallocated blocks of memory space within the non-volatile memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In view of the above issues, the present disclosure describes a system and methods for efficiently allocating memory space with low latency overhead, even in large scale storage applications. Such a system and methods are described below in further detail.

Figure 1:
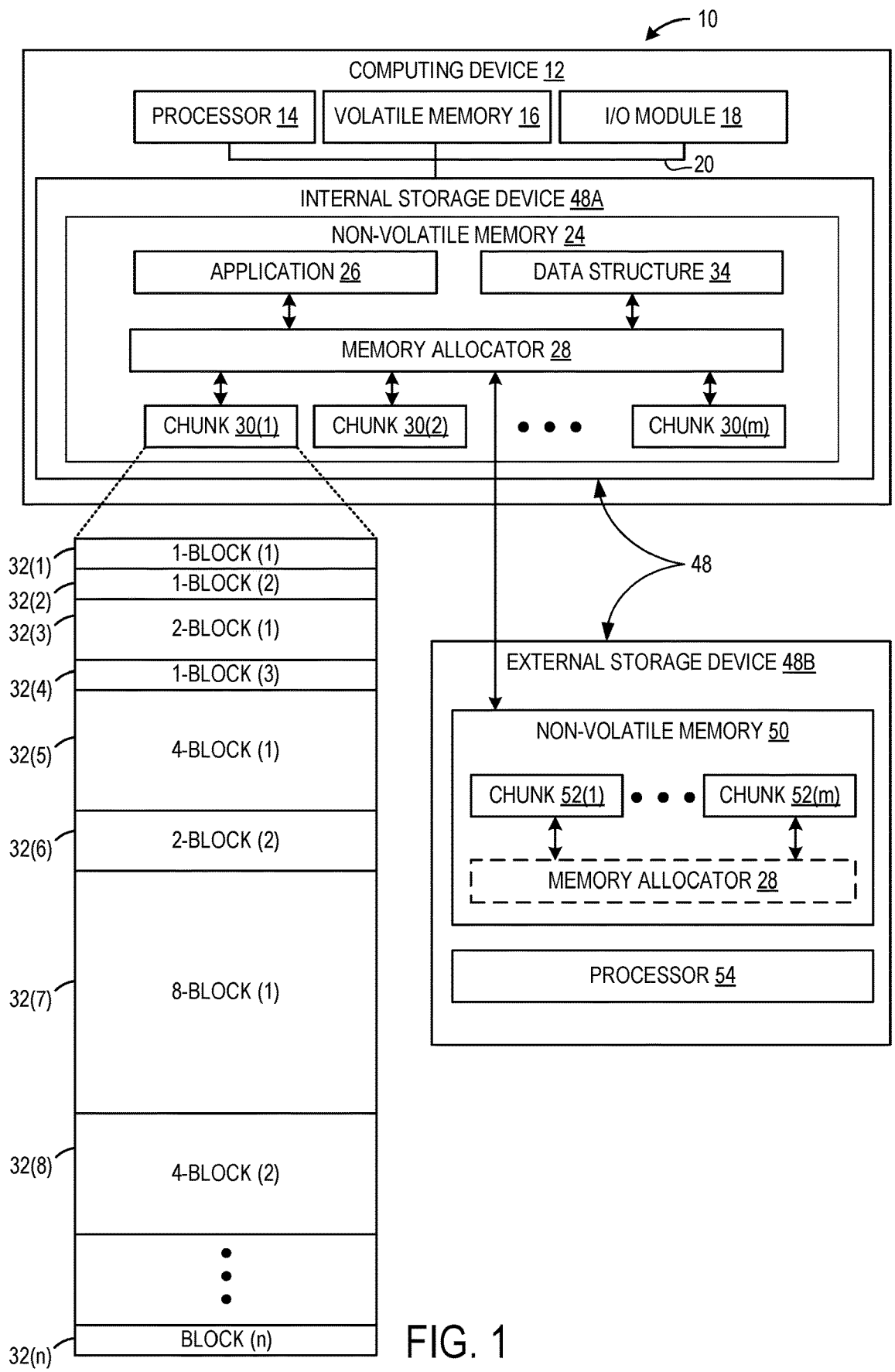
FIG. 1 illustrates a schematic view of a computing system according to an example of the present disclosure.

Referring to FIG. 1, a computing system 10 with a memory allocator 28 is provided. The computing system 10 comprises a computing device 12 including a processor 14, volatile memory 16, an input/output module 18, and non-volatile memory 24 storing a memory allocator 28 communicatively coupled to at least one application 26 and a tree data structure 34. A bus 20 may operatively couple the processor 14, the input/output module 18, and the volatile memory 16 to the non-volatile memory 24. The processor 14 is configured to execute the memory allocator 28 using portions of the volatile memory 16 to allocate blocks of non-volatile memory 24 on a storage device according to a tree data structure 34 comprising a plurality of counter sets, each counter set including one or a plurality of counters indicating numbers of unallocated blocks of memory space within the non-volatile memory 24. In this example, the storage device is an internal storage device 48A in the computing device 12, and includes non-volatile memory 24. However, additionally or alternatively, the processor 14 may be configured to execute the memory allocator 28 using portions of volatile memory 16 to allocate blocks of non-volatile memory 50 on an external storage device 48B, which includes non-volatile memory 50. The processor 14 of computing device 12 communicates with the internal storage device 48A via a bus or interconnect, for example, and communicates with the external storage device 48B via an Ethernet or other network connection, rather than over a bus or interconnect. The external storage device 48B may be a rack mounted storage platform containing individual solid state drives and the computing device may be a rack mounted server in a data center, in one particular example.

The processor 14 is configured to store the application 26 and the memory allocator 28 in non-volatile memory 24 that retains instructions stored data even in the absence of externally applied power, such as FLASH memory, a hard disk, read only memory (ROM), electrically erasable programmable memory (EEPROM), etc. The instructions include one or more programs, including the application 26 and the memory allocator 28, and data used by such programs sufficient to perform the operations described herein. In response to execution by the processor 14, the instructions cause the processor 14 to execute the application 26 and the memory allocator 28. The application 26 may run as any number of application threads, including a single application thread.

The processor 14 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. Volatile memory 16 can include physical devices such as random access memory (RAM), static random access memory (SRAM), dynamic random access memory (DRAM), etc., which temporarily stores data only for so long as power is applied during execution of programs. Non-volatile memory 24 can include physical devices that are removable and/or built in, such as optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology.

The non-volatile memory 24 is organized into multiple (m) chunks 30(1)-(m) (illustrated as chunks 30(1), . . . 30(m)). The number of chunks 30(1)-(m) in the non-volatile memory 24, and the number of bytes of memory included in each chunk 30(1)-(m), can vary depending on the type of computing device 12 on which the computing system 10 is implemented.

The memory allocator 28 is configured to manage the allocation of space within the non-volatile memory 24 to the application 26 by receiving, from an application thread of the application 26, a memory allocation request for memory to be allocated to the application thread, iterating through the plurality of counters in the plurality of counter sets to identify a counter set with counters which meet the memory allocation request, identifying unallocated blocks based on the identification of the counter set with counters which meet the memory allocation request, allocating the identified unallocated blocks to the application thread, and sending an indication of the allocated blocks to the application thread.

Each chunk includes multiple different blocks. In the illustrated example, chunk 30(1) is expanded to show multiple (n) blocks 32(1)-(n) (illustrated as blocks 32(1), . . . 32(n)). Different chunks can have the same number of blocks, or alternatively different chunks can have different numbers of blocks. A block can have any number of bytes, and the number of bytes in a block can vary based on the type of the computing device 12. For example, the number of bytes in a one-block can be 32 bytes, 64 bytes, 1000 bytes, and so forth.

In this example, the chunk 30(1) comprises four types of blocks: a one-block which is 1 block in size, a two-block which is 2 blocks in size, a four-block which is 4 blocks in size, and an eight-block which is 8 blocks in size. Blocks 32(1), 32(2), and 32(4) are one-blocks, blocks 32(3) and 32(6) are two-blocks, blocks 32(5) and 32(8) are four-blocks, and block 32(7) is an eight-block.

Additionally or alternatively, the memory allocator 28 may be configured to manage the allocation of space within non-volatile memory 50 of an external storage device 48B. The non-volatile memory 50 is also organized into multiple (m) chunks 52(1)-(m) (illustrated as chunks 52(1), . . . 52(m)), which may be managed by the memory allocator 28 according to the tree data structure 34. A processor of the computing device 12, which may include the internal storage device 48A, may execute the memory allocator 28, such that the memory allocator 28 may be executed by the processor 14 on the non-volatile memory 24 of the computing device 12 and/or executed by the processor 54 on the non-volatile memory 50 of the internal storage device 48A (see dashed block indicating the memory allocator 28 instantiated on non-volatile memory 50) to manage the allocation of space within the non-volatile memory 50 of the external storage device 48B.

Figure 2:
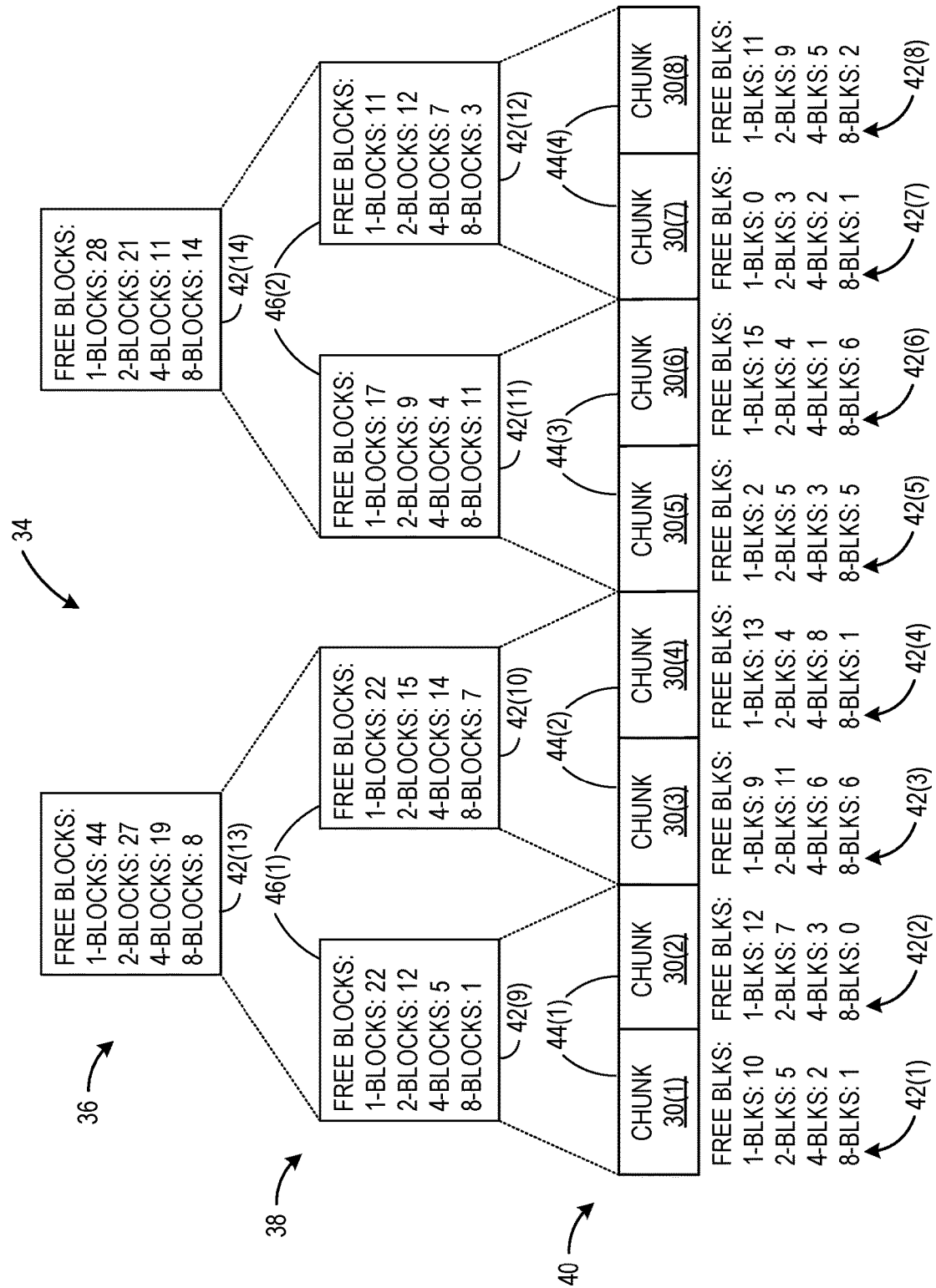
FIG. 2 illustrates a tree data structure of the computing system of FIG. 1.

FIG. 2 is a block diagram that illustrates a tree data structure 34 in accordance with aspects of the subject matter described herein. Each chunk 30(1)-(8) has an associated counter set 42(1)-(8) that identifies which blocks within the chunk are available. One or a plurality of counters in each counter set 42(1)-(8) indicate numbers of unallocated blocks of different sizes within the particular chunk 30(1)-(8). The plurality of counter sets 42(1)-(14) in the tree data structure 34 are organized into a hierarchical structure with a plurality of levels 36-40. A block being available or unallocated refers to the block not currently being allocated to an application thread and not otherwise being used, and thus can be allocated to an application thread in response to a memory allocation request. An available or unallocated block can also be referred to as a free block.

In this example, the one or the plurality of counters include a one-block counter for one-blocks which are 1 block in size, a two-block counter for two-blocks which are 2 blocks in size, a four-block counter for four-blocks which are 4 blocks in size, and an eight-block counter for eight-blocks which are 8 blocks in size. If the one-block counter is 10 for a given chunk, this means that, in the given chunk, there are 10 free one-blocks. If the two-block counter is 5 for the given chunk, this means that, in the given chunk, there are 5 free two-blocks. If each one-block is 1K in size, then each two-block is 2K in size, each four-block is 4K in size, and each eight-block is 8K in size. Note that the groupings of blocks into one-blocks, two-blocks, four-blocks, and eight-blocks is not intended to limit aspects of the subject matter described herein to just these sizes of blocks.

The tree data structure 34 may include at least a top level 36 and a bottom level 40. Even though three levels are illustrated, in other embodiments, there may be two, four, or more levels. Here, the tree data structure 34 includes three levels 36, 38, 40. Level 36 may be said to be higher than level 38 which may be said to be higher than level 40.

Each of the levels 36-40 includes counter sets that indicate the numbers of available or free blocks for a given chunk or groups of chunks. For example, at the bottom level 40, each counter set 42(1)-(8) may include one or a plurality of counters indicating numbers of unallocated blocks of memory space within one of a plurality of chunks 30(1)-(8), each chunk 30(1)-(8) comprising a plurality of blocks of memory space. At a primary level 38 immediately above the bottom level 40, each counter set 42(9)-(12) includes one or a plurality of counters indicating numbers of unallocated blocks of memory space within one of a plurality of primary chunk groups 44(1)-(4), each primary chunk group 44(1)-(4) comprising two or more chunks. In this example, each primary chunk group 44(1)-(4) encompasses two chunks.

At a secondary level 36 immediately above the primary level 38, each counter set 42(13), 42(14) includes one or a plurality of counters indicating numbers of unallocated blocks of memory space within one or a plurality of secondary chunk groups 46(1), 46(2), each secondary chunk group comprising two or more primary chunk groups. In this example, each secondary chunk group encompasses two primary chunk groups. Note that the grouping of two chunks in each primary chunk group, and the grouping of two primary chunk groups into each secondary chunk group 46(1), 46(2) is exemplary only and is not intended to limit aspects of the subject matter described herein to just these numbers of chunks and chunk groups.

To allocate free space in the non-volatile memory 24, the memory allocator 28 is executed to iterate through the plurality of counters in the plurality of counter sets in each level from the top level 36 to the bottom level 40, in this order. When the memory allocator 28 receives a memory allocation request from an application thread of an application 26, the memory allocator 28 first calculates the number of available one-blocks, two-blocks, four-blocks, and eight-blocks that are needed to meet the memory allocation request. For example, if 50 blocks of free space are requested in the memory allocation request, then the memory allocator 28 determines that six free eight-blocks and one free two-block are needed to fulfill the memory allocation request. The memory allocator 28 then iterates through counters in the counter sets 42(13), 42(14) in the top level 36 of the tree data structure 34, querying for a secondary chunk group with counters which meet the memory allocation request. For example, if the counter set 42(13) for the secondary chunk group 46(1) has an eight-block counter that has at least a count of six and a two-block counter that has at least a count of one, then the memory allocator 28 identifies secondary chunk group 46(1) as the secondary chunk group with the counters which meet the memory allocation request.

The memory allocator 28 then iterates through the counters of the counter sets 42(9), 42(10) of the primary chunk groups 44(1), 44(2), respectively, belonging to the secondary chunk group 46(1), querying for a primary chunk group with counters which meet the memory allocation request. If the counter set 42(10) for the primary chunk group 44(2) also has an eight-block counter that has at least a count of six and a two-block counter that has at least a count of one, then the memory allocator 28 identifies primary chunk group 44(2) as the primary chunk group with the counters which meet the memory allocation request. Then the memory allocator 28 iterates through the counters in the counter sets 42(3), 42(4) of chunks 30(3), 30(4), respectively, belonging to the primary chunk group 44(2), querying for a chunk with counters which meet the memory allocation request. The querying within a given chunk may be performed with a simple linear search. Thus, the memory allocator 28 iterates through each level of the tree data structure 34 until the bottom level 40 with the chunks is reached.

Then the memory allocator 28 iterates through the one or more counters in each counter set at the bottom level 40 of the tree data structure 34, querying for a chunk with the counters which meet the memory allocation request. If the counter set 42(3) for the chunk 30(3) also has an eight-block counter that has at least a count of six and a two-block counter that has at least a count of one, then the memory allocator 28 identifies the chunk 30(3) as the chunk which meets the memory allocation request, and then allocates six eight-blocks and one two-block in the chunk 30(3) in accordance with the memory allocation request. The memory allocator 28 sends an indication of the allocated blocks to the application thread informing that the blocks have been allocated in accordance with the memory allocation request. Then the memory allocator 28 updates the counters in the counter sets in each level from the bottom level 40 to the top level 36 in the tree data structure 34, in this order. In this example, the eight-block counters are decreased by six and the two-block counters are decreased by one in the counter set 42(3) for chunk 30(3), the counter set 42(10) for the primary chunk group 44(2), and the counter set 42(13) for the secondary chunk group 46(1).

To release free space in the non-volatile memory 24, the tree data structure 34 is updated in each level from the bottom level 40 to the top level 36. When it is determined that application 26 no longer uses the allocated memory space, the memory allocator 28 calculates the number of blocks to release, and then releases the blocks in accordance with the calculated number of blocks. An application thread of the application 26 may send a de-allocation request to de-allocate the allocated memory space, and the memory allocator 28 may determine, based on the de-allocation request, that the application 26 no longer uses the allocated memory space.

Then the memory allocator 28 updates the free range counters in the counter sets in each level from the bottom level to the top level of the tree data structure 34. The memory allocator 28 first updates the free range counters in the counter set of the chunk where the free space is released. For example, when one one-block of free space is released in chunk 30(1), then the one-block counter in the counter set 42(1) for chunk 30(1) is increased by one. At the middle level 38, the one-block counter is increased by one in the counter set 42(9) for the primary chunk group 44(1), to which chunk 30(1) belongs. Then at the top level 40, the one-block counter is also increased by one in the counter set 42(13) for secondary chunk group 46(1), to which primary chunk group 44(1) belongs.

Free space may be released through a combination of different free range counters. For example, when twenty blocks of free space are released, then the eight-block counters may be increased by two and the four-block counter may be increased by one in the counter set 42(3) for chunk 30(3), the counter set 42(10) for primary chunk group 44(2), and the counter set 42(13) for secondary chunk group 46(1). When six blocks of free space are released, then the eight-block counter may be increased by one and the two block counter may be decreased by one in the counter set 42(3) for chunk 30(3), the counter set 42(10) for primary chunk group 44(2), and the counter set 42(13) for secondary chunk group 46(1).

Figure 3:
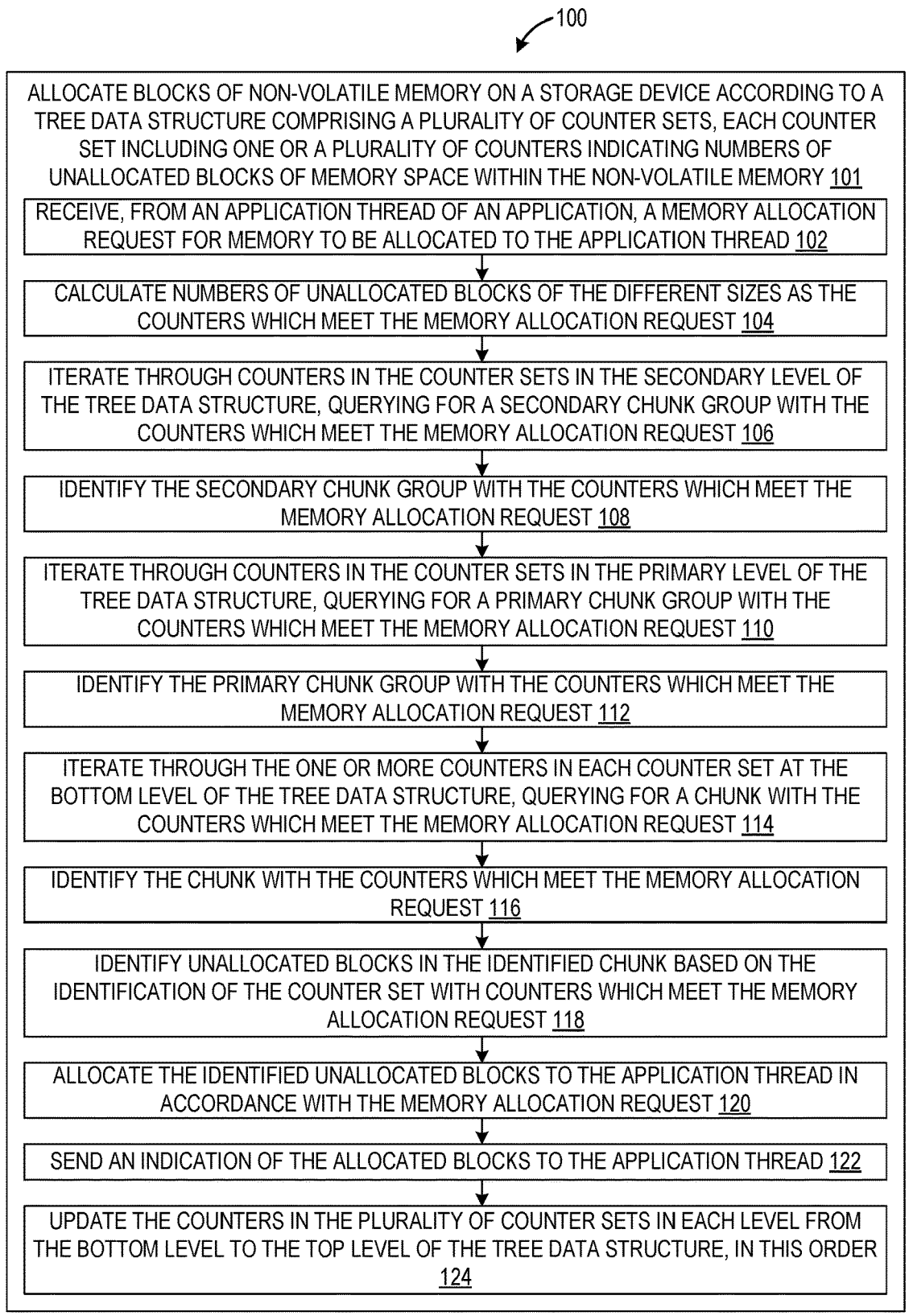
FIG. 3 is a flowchart of a method for allocating memory space according to an example embodiment of the present disclosure.

FIG. 3 illustrates a flowchart of a computerized method 100 for allocating memory space in accordance with a memory allocation request. The computerized method 100 comprises a step 101 of allocating blocks of non-volatile memory on a storage device according to a tree data structure comprising a plurality of counter sets, each counter set including one or a plurality of counters indicating numbers of unallocated blocks of memory space within the non-volatile memory. The following description of computerized method 100 is provided with reference to the software and hardware components described above and shown in FIGS. 1 and 2. It will be appreciated that computerized method 100 also may be performed in other contexts using other suitable hardware and software components. Step 101 comprises steps 102 through 124.

Step 102 is performed to receive, from an application thread of an application, a memory allocation request for memory to be allocated to the application thread. Step 104 is performed to calculate numbers of unallocated blocks of the different sizes as the counters which meet the memory allocation request. Step 106 is performed to iterate through counters in the counter sets in the secondary level of the tree data structure, querying for a secondary chunk group with the counters which meet the memory allocation request. Step 108 is performed to identify the secondary chunk group with the counters which meet the memory allocation request.

Step 110 is performed to iterate through counters in the counter sets in the primary level of the tree data structure, querying for a primary chunk group with the counters which meet the memory allocation request. Step 112 is performed to identify the primary chunk group with the counters which meet the memory allocation request.

Step 114 is performed to iterate through the one or more counters in each counter set at the bottom level of the tree data structure, querying for a chunk with the counters which meet the memory allocation request. Step 116 is performed to identify the chunk with the counters which meet the memory allocation request. Step 118 is performed to identify unallocated blocks in the identified chunk based on the identification of the counter set with counters which meet the memory allocation request.

Step 120 is performed to allocate the identified unallocated blocks to the application thread in accordance with the memory allocation request. Step 122 is performed to send an indication of the allocated blocks to the application thread. Step 124 is performed to update the counters in the plurality of counter sets from the bottom level to the top level of the tree data structure, in this order. Note that the steps described above to iterate through three levels of the tree data structure is not intended to limit aspects of the subject matter described herein to just three levels of the tree data structure, and the number of levels to be iterated through in the computerized method 100 may be two or more than three.

Figure 4:
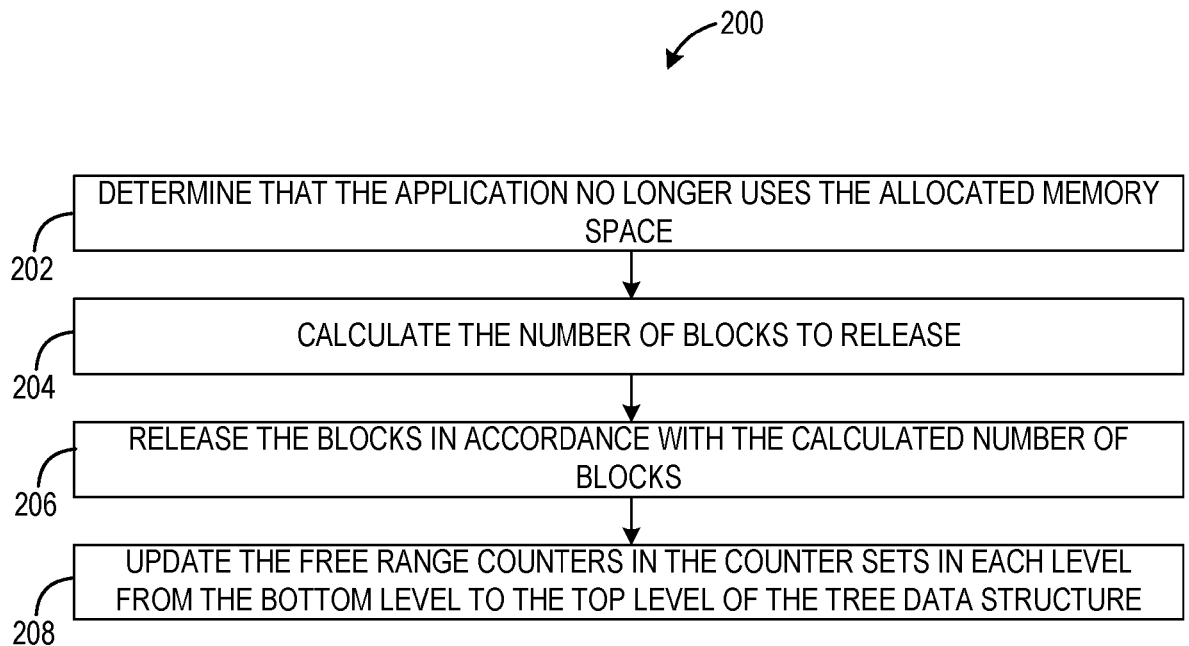
FIG. 4 is a flowchart of a method for releasing allocated memory space according to an example embodiment of the present disclosure.

FIG. 4 illustrates a flowchart of a computerized method 200 for releasing allocated memory space. The following description of computerized method 200 is provided with reference to the software and hardware components described above and shown in FIGS. 1 and 2. It will be appreciated that computerized method 100 also may be performed in other contexts using other suitable hardware and software components. At step 202, it is determined that the application no longer uses the allocated memory space. At step 204, the number of blocks to release is calculated. At step 206, the blocks are released in accordance with the calculated number of blocks. At step 208, the free range counters are updated in the counter sets in each level from the bottom level to the top level of the tree data structure.

The above-described system and methods allow memory space to be allocated and released at scale while maintaining low latency overhead, even when free space is fragmented in a large memory space. Time complexity may be lower and memory usage stability may be higher compared to the use of bitmaps and range lists to allocate and release memory spaces.

Figure 5:
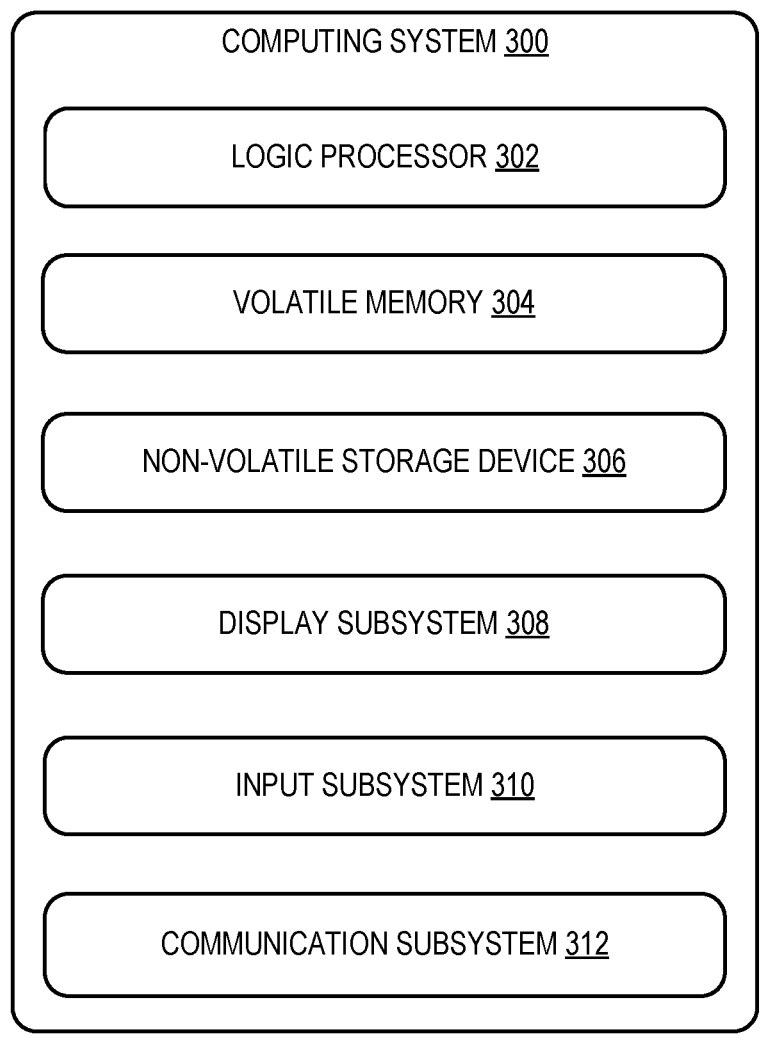
FIG. 5 shows an example computing environment of the present disclosure.

FIG. 5 schematically shows a non-limiting embodiment of a computing system 300 that can enact one or more of the methods and processes described above. Computing system 300 is shown in simplified form. Computing system 300 may embody the computing device 12 and the storage devices 48 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 5.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 302 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a computing system for allocating memory space, comprising a processor and memory of a computing device, the processor being configured to execute a memory allocator using portions of the memory to allocate blocks of non-volatile memory on a storage device according to a tree data structure comprising a plurality of counter sets, each counter set including one or a plurality of counters indicating numbers of unallocated blocks of memory space within the non-volatile memory. In this aspect, additionally or alternatively, the computing device includes the storage device. In this aspect, additionally or alternatively, the tree data structure comprises a plurality of levels including at least a top level and a bottom level, at the bottom level, each counter set includes one or more counters indicating numbers of unallocated blocks of memory space within one of a plurality of chunks, each chunk comprising a plurality of blocks of memory space, and the memory allocator is configured to iterate through the one or more counters in each counter set at the bottom level of the tree data structure, querying for a chunk with counters which meet a memory allocation request. In this aspect, additionally or alternatively, the plurality of levels include a primary level which is immediately above the bottom level, and at the primary level, each counter set includes one or a plurality of counters indicating numbers of unallocated blocks of memory space within one of a plurality of primary chunk groups, each primary chunk group comprising two or more chunks. In this aspect, additionally or alternatively, the plurality of levels include a secondary level which is immediately above the primary level, and at the secondary level immediately above the primary level, each counter set includes one or a plurality of counters indicating numbers of unallocated blocks of memory space within one of a plurality of secondary chunk groups, each secondary chunk group comprising two or more primary chunk groups. In this aspect, additionally or alternatively, the one or the plurality of counters of each counter set indicate numbers of unallocated blocks of different sizes. In this aspect, additionally or alternatively, the one or the plurality of counters include a one-block counter for one-blocks which are 1 block in size and a two-block counter for two-blocks which are 2 blocks in size. In this aspect, additionally or alternatively, the memory allocator is executed to receive, from an application thread of an application, a memory allocation request for memory to be allocated to the application thread, iterate through the plurality of counters in the plurality of counter sets to identify a counter set with counters which meet the memory allocation request, identify unallocated blocks based on the identification of the counter set with counters which meet the memory allocation request, allocate the identified unallocated blocks to the application thread in accordance with the memory allocation request, and send an indication of the allocated blocks to the application thread. In this aspect, additionally or alternatively, the tree data structure comprises a plurality of levels including at least a top level and a bottom level, and the memory allocator is executed to iterate through the plurality of counters in the plurality of counter sets in each level from the top level to the bottom level of the tree data structure, in this order. In this aspect, additionally or alternatively, following the allocation of the identified unallocated blocks, the plurality of counters in the plurality of counter sets are updated in each level from the bottom level to the top level of the tree data structure, in this order.

Another aspect provides a computing method for allocating memory space, comprising a step to allocate blocks of non-volatile memory on a storage device according to a tree data structure comprising a plurality of counter sets, each counter set including one or a plurality of counters indicating numbers of unallocated blocks of memory space within the non-volatile memory. In this aspect, additionally or alternatively, the method further comprises steps to receive, from an application thread of an application, a memory allocation request for memory to be allocated to the application thread, iterate through the plurality of counters in the plurality of counter sets to identify a counter set with counters which meet the memory allocation request, identify unallocated blocks based on the identification of the counter set with counters which meet the memory allocation request, allocate the identified unallocated blocks to the application thread in accordance with the memory allocation request, and send an indication of the allocated blocks to the application thread. In this aspect, additionally or alternatively, the one or the plurality of counters of each counter set indicate numbers of unallocated blocks of different sizes, and the computing method further comprises a step to calculate numbers of unallocated blocks of the different sizes as the counters which meet the memory allocation request. In this aspect, additionally or alternatively, the tree data structure comprises a plurality of levels including at least a top level and a bottom level, and the one or the plurality of counters in the plurality of counter sets are iterated through in each level from the top level to the bottom level of the tree data structure, in this order. In this aspect, additionally or alternatively, following the allocation of the identified unallocated blocks, the one or the plurality of counters in the plurality of counter sets are updated in each level from the bottom level to the top level of the tree data structure, in this order. In this aspect, additionally or alternatively, the method further comprises a step to iterate through the one or more counters in each counter set at the bottom level of the tree data structure, querying for a chunk with the counters which meet the memory allocation request. In this aspect, additionally or alternatively, the querying for the chunk with the counters which meet the memory allocation request is performed with a linear search. In this aspect, additionally or alternatively, at a primary level immediately above the bottom level, each counter set includes one or a plurality of counters indicating numbers of unallocated blocks of memory space within one of a plurality of primary chunk groups, each primary chunk group comprising two or more chunks, and the computing method includes a step to iterate through counters in the counter sets in the primary level of the tree data structure, querying for a primary chunk group with the counters which meet the memory allocation request. In this aspect, additionally or alternatively, at a secondary level immediately above the primary level, each counter set includes one or a plurality of counters indicating numbers of unallocated blocks of memory space within one of a plurality of secondary chunk groups, each secondary chunk group comprising two or more primary chunk groups, and the computing method includes a step to iterate through counters in the counter sets in the secondary level of the tree data structure, querying for a secondary chunk group with the counters which meet the memory allocation request.

Another aspect provides a computing system for allocating memory space, comprising a processor, non-volatile memory, and volatile memory of a computing device, the non-volatile memory being divided into a plurality of chunks, each chunk comprising a plurality of blocks, a tree data structure, stored on the non-volatile memory, comprising a plurality of counter sets, each counter set including one or a plurality of counters indicating numbers of unallocated blocks of memory space within the non-volatile memory, the plurality of counter sets including a counter set for each of the plurality of chunks indicating numbers of unallocated blocks within each chunk, and the processor being configured to execute a memory allocator using portions of the volatile memory to allocate blocks of non-volatile memory on a storage device according to the tree data structure.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for allocating memory space, comprising:
   a processor and memory of a computing device, the processor being configured to execute a memory allocator using portions of the memory to:
   allocate blocks of non-volatile memory on a storage device according to a tree data structure comprising a plurality of counter sets, each counter set including one or a plurality of counters indicating numbers of unallocated blocks of memory space within the non-volatile memory, wherein
   the one or the plurality of counters of each counter set indicate numbers of unallocated blocks of different sizes.

2. The computing system of claim 1, wherein the computing device includes the storage device.

3. The computing system of claim 1, wherein
   the tree data structure comprises a plurality of levels including at least a top level and a bottom level;
   at the bottom level, each counter set includes one or more counters indicating numbers of unallocated blocks of memory space within one of a plurality of chunks, each chunk comprising a plurality of blocks of memory space; and
   the memory allocator is configured to iterate through the one or more counters in each counter set at the bottom level of the tree data structure, querying for a chunk with counters which meet a memory allocation request.

4. The computing system of claim 3, wherein
   the plurality of levels include a primary level which is immediately above the bottom level; and
   at the primary level, each counter set includes one or a plurality of counters indicating numbers of unallocated blocks of memory space within one of a plurality of primary chunk groups, each primary chunk group comprising two or more chunks.

5. The computing system of claim 4, wherein
   the plurality of levels include a secondary level which is immediately above the primary level; and
   at the secondary level immediately above the primary level, each counter set includes one or a plurality of counters indicating numbers of unallocated blocks of memory space within one of a plurality of secondary chunk groups, each secondary chunk group comprising two or more primary chunk groups.

6. The computing system of claim 1, wherein
   the one or the plurality of counters include a one-block counter for one-blocks which are 1 block in size and a two-block counter for two-blocks which are 2 blocks in size.

7. The computing system of claim 1, wherein the memory allocator is executed to:
   receive, from an application thread of an application, a memory allocation request for memory to be allocated to the application thread;
   iterate through the plurality of counters in the plurality of counter sets to identify a counter set with counters which meet the memory allocation request;
   identify unallocated blocks based on the identification of the counter set with counters which meet the memory allocation request;
   allocate the identified unallocated blocks to the application thread in accordance with the memory allocation request; and
   send an indication of the allocated blocks to the application thread.

8. The computing system of claim 7, wherein
   the tree data structure comprises a plurality of levels including at least a top level and a bottom level; and
   the memory allocator is executed to iterate through the plurality of counters in the plurality of counter sets in each level from the top level to the bottom level of the tree data structure, in this order.

9. The computing system of claim 8, wherein following the allocation of the identified unallocated blocks, the plurality of counters in the plurality of counter sets are updated in each level from the bottom level to the top level of the tree data structure, in this order.

10. A computing method for allocating memory space, comprising a step to:
   allocate blocks of non-volatile memory on a storage device according to a tree data structure comprising a plurality of counter sets, each counter set including one or a plurality of counters indicating numbers of unallocated blocks of memory space within the non-volatile memory, wherein
   the one or the plurality of counters of each counter set indicate numbers of unallocated blocks of different sizes; and
   the computing method further comprises a step to calculate numbers of unallocated blocks of the different sizes as counters which meet a memory allocation request.

11. The computing method of claim 10, further comprising steps to:
   receive, from an application thread of an application, the memory allocation request for memory to be allocated to the application thread;
   iterate through the plurality of counters in the plurality of counter sets to identify a counter set with the counters which meet the memory allocation request;
   identify unallocated blocks based on an identification of the counter set with counters which meet the memory allocation request;
   allocate the identified unallocated blocks to the application thread in accordance with the memory allocation request; and
   send an indication of the allocated blocks to the application thread.

12. The computing method of claim 11, wherein
   the tree data structure comprises a plurality of levels including at least a top level and a bottom level; and
   the one or the plurality of counters in the plurality of counter sets are iterated through in each level from the top level to the bottom level of the tree data structure, in this order.

13. The computing method of claim 12, wherein following the allocation of the identified unallocated blocks, the one or the plurality of counters in the plurality of counter sets are updated in each level from the bottom level to the top level of the tree data structure, in this order.

14. The computing method of claim 12, further comprising a step to iterate through the one or more counters in each counter set at the bottom level of the tree data structure, querying for a chunk with the counters which meet the memory allocation request.

15. The computing method of claim 14, wherein the querying for the chunk with the counters which meet the memory allocation request is performed with a linear search.

16. The computing method of claim 12, wherein
   at a primary level immediately above the bottom level, each counter set includes one or a plurality of counters indicating numbers of unallocated blocks of memory space within one of a plurality of primary chunk groups, each primary chunk group comprising two or more chunks; and
   the computing method includes a step to iterate through counters in the counter sets in the primary level of the tree data structure, querying for a primary chunk group with the counters which meet the memory allocation request.

17. The computing method of claim 16, wherein
   at a secondary level immediately above the primary level, each counter set includes one or a plurality of counters indicating numbers of unallocated blocks of memory space within one of a plurality of secondary chunk groups, each secondary chunk group comprising two or more primary chunk groups; and
   the computing method includes a step to iterate through counters in the counter sets in the secondary level of the tree data structure, querying for a secondary chunk group with the counters which meet the memory allocation request.

18. A computing system for allocating memory space, comprising:
   a processor, non-volatile memory, and volatile memory of a computing device, wherein
      the non-volatile memory is divided into a plurality of chunks, each chunk comprising a plurality of blocks;
      a tree data structure, stored on the non-volatile memory, comprises a plurality of counter sets, each counter set including one or a plurality of counters indicating numbers of unallocated blocks of memory space within the non-volatile memory, the one or the plurality of counters of each counter set indicating numbers of unallocated blocks of different sizes;
      the plurality of counter sets includes a counter set for each of the plurality of chunks indicating numbers of unallocated blocks within each chunk; and
   the processor is configured to execute a memory allocator using portions of the volatile memory to allocate blocks of non-volatile memory on a storage device according to the tree data structure.

* * * * *